US012432501B2

(12) United States Patent
Liu et al.

(10) Patent No.: US 12,432,501 B2
(45) Date of Patent: Sep. 30, 2025

(54) SOUND PRODUCTION APPARATUS AND ELECTRONIC DEVICE

(71) Applicant: GOERTEK INC., Shandong (CN)

(72) Inventors: Chunfa Liu, Shandong (CN); Jianbin Yang, Shandong (CN); Jianxin Wang, Shandong (CN); Shousong Qiang, Shandong (CN)

(73) Assignee: GOERTEK INC., Weifang (CN)

( * ) Notice: Subject to any disclaimer, the term of this patent is extended or adjusted under 35 U.S.C. 154(b) by 410 days.

(21) Appl. No.: 17/999,881

(22) PCT Filed: Nov. 7, 2020

(86) PCT No.: PCT/CN2020/127340
§ 371 (c)(1),
(2) Date: Nov. 25, 2022

(87) PCT Pub. No.: WO2021/238077
PCT Pub. Date: Dec. 2, 2021

(65) Prior Publication Data

US 2023/0247366 A1 Aug. 3, 2023

(30) Foreign Application Priority Data

May 25, 2020 (CN) ......................... 202010458516.6

(51) Int. Cl.

| | |
|---|---|
| ***H04R 9/04*** | (2006.01) |
| ***H04R 9/02*** | (2006.01) |
| ***H04R 9/06*** | (2006.01) |

(52) U.S. Cl.
CPC ............. *H04R 9/043* (2013.01); *H04R 9/025* (2013.01); *H04R 9/045* (2013.01); *H04R 9/06* (2013.01)

(58) Field of Classification Search
CPC ........ H04R 9/043; H04R 9/025; H04R 9/045; H04R 9/06; H04R 7/26; H04R 9/041
See application file for complete search history.

(56) References Cited

U.S. PATENT DOCUMENTS 4,239,943 A * 12/1980 Czerwinski .............. H04R 7/16 381/403
5,734,132 A * 3/1998 Proni ....................... H04R 7/20 381/407

(Continued)

FOREIGN PATENT DOCUMENTS

CN 101766035 A 6/2010
CN 202738054 U 2/2013

(Continued)

OTHER PUBLICATIONS

International Search Report from International Application No. PCT/CN2020/127340 mailed Feb. 24, 2021.

*Primary Examiner* — Angelica M McKinney
(74) *Attorney, Agent, or Firm* — Shih IP Law Group, PLLC

(57) ABSTRACT

Disclosed are a sound production apparatus and an electronic device, the sound production apparatus comprises an elastic member and a component to be connected, the elastic member comprises a connection end, the component to be connected comprises a coupling region, and a shape and a structure of the connection end are configured such that the connection end is fitted with the coupling region when coupling the connection end and the coupling region. The technical solutions of the present disclosure are intended to have a good coupling effect at the connection between the elastic member and the component to be connected, and to improve the reliability of the sound production apparatus.

16 Claims, 7 Drawing Sheets

(56) References Cited

U.S. PATENT DOCUMENTS

| | | | | |
|---|---|---|---|---|
| 10,469,952 | B2 * | 11/2019 | Chen | H04R 9/041 |
| 2004/0120542 | A1 | 6/2004 | Morris | |
| 2005/0147272 | A1 * | 7/2005 | Hyre | H04R 9/06<br>381/404 |
| 2011/0243364 | A1 * | 10/2011 | Walter | H04R 9/025<br>381/397 |
| 2013/0058521 | A1 * | 3/2013 | Davidson | H04R 7/26<br>381/398 |

FOREIGN PATENT DOCUMENTS

| | | | | | |
|---|---|---|---|---|---|
| CN | 202799103 | U | | 3/2013 | |
| CN | 104320742 | A | | 1/2015 | |
| CN | 204090139 | U | * | 1/2015 | H04R 31/006 |
| CN | 207491210 | U | | 6/2018 | |
| CN | 110545509 | A | * | 12/2019 | H04R 31/006 |
| CN | 110662155 | A | | 1/2020 | |
| CN | 110719554 | A | | 1/2020 | |
| JP | 2004007331 | A | | 1/2004 | |
| JP | 2004297467 | A | * | 10/2004 | H04R 31/006 |
| KR | 20120009980 | A | | 2/2012 | |

* cited by examiner

SOUND PRODUCTION APPARATUS AND ELECTRONIC DEVICE

TECHNICAL FIELD

The present disclosure relates to the technical field of electro-acoustic, and in particular, to a sound production apparatus and an electronic device.

BACKGROUND ART

As a transducer device that converts electrical signals into sound signals, a sound production apparatus is an important acoustic component in an electronic device. With the continuous progress and innovation of technology, the structural design of traditional sound production apparatus is also constantly seeking for innovation and change. It not only needs to meet the development trend of thinning, but also pay more and more attention to the optimization of performance, and give consideration to the process simplification and cost control.

In the sound production apparatus of the exemplary technology, when an elastic member is used to connect with other structure, a certain amount of warping may occur when the elastic member is connected with other structure, and when the elastic member is subjected to a large force, and generates a large displacement, there is a large stress at a position where the elastic member and a component to be connected are connected, which leads to fracture at the connection and reduce the reliability of the sound production apparatus.

SUMMARY

A main object of the present disclosure is to provide a sound production apparatus, which aims to allow the connection between the elastic member and the component to be connected to have an excellent coupling effect and improve the reliability of the sound production apparatus.

In order to achieve the above object, the present disclosure provides a sound production apparatus including an elastic member and a component to be connected, the elastic member includes a connection end, the component to be connected includes a coupling region, and a shape and a structure of the connection end are configured such that the connection end is fitted with the coupling region when coupling the connection end and the coupling region.

In some embodiments of the present disclosure, the elastic member further includes a jointing region away from the connection end and jointed with the connection end, a gap is provided between the jointing region and the component to be connected, a buffer part is disposed within the gap, and the buffer part fills the gap between the jointing region and the component to be connected.

In some embodiments of the present disclosure, the component to be connected includes a voice coil assembly, the voice coil assembly has a voice coil assembly coupling region, and the shape and the structure of the connection end are configured such that the connection end is fitted with the voice coil assembly coupling region when coupling the connection end and the voice coil assembly coupling region;

and/or, the component to be connected includes a housing, the housing has a housing coupling region, and the shape and the structure of the connection end are configured such that the connection end is fitted with the housing coupling region when coupling the connection end and the housing coupling region;

or, the component to be connected includes a voice coil assembly and a housing, the voice coil assembly has a voice coil assembly coupling region, the housing has a housing coupling region, and the elastic member is provided with at least two connection ends;

a shape and a structure of one connection end are configured such that the one connection end is fitted with the voice coil assembly coupling region when coupling the one connection end and the voice coil assembly coupling region;

a shape and a structure of another connection end are configured such that the another connection end is fitted with the housing coupling region when coupling the another connection end and the housing coupling region.

In some embodiments of the present disclosure, the component to be connected includes a cup, the cup has a cup coupling region, and the shape and the structure of the connection end are configured such that the connection end is fitted with the cup coupling region when coupling the connection end and the cup coupling region;

and/or, the component to be connected includes a housing, the housing has a housing coupling region, and the shape and the structure of the connection end are configured such that the connection end is fitted with the housing coupling region when coupling the connection end and the housing coupling region;

or, the component to be connected includes a cup and a housing, the cup has a cup coupling region, the housing has a housing coupling region, and the elastic member is provided with at least two connection ends;

a shape and a structure of one connection end are configured such that the one connection end is fitted with the cup coupling region when coupling the one connection end and the cup coupling region;

a shape and a structure of another connection end are configured such that the another connection end is fitted with the housing coupling region when coupling the another connection end and the housing coupling region.

In some embodiments of the present disclosure, the component to be connected includes a cup, the cup has a cup coupling region, and the shape and the structure of the connection end are configured such that the connection end is fitted with the cup coupling region when coupling the connection end and the cup coupling region;

and/or, the component to be connected includes a magnetic circuit system, the magnetic circuit system has a magnetic circuit system coupling region, and the shape and the structure of the connection end are configured such that the connection end is fitted with the magnetic circuit system coupling region when coupling the connection end and the magnetic circuit system coupling region;

or, the component to be connected includes a cup and a magnetic circuit system, the cup has a cup coupling region, the magnetic circuit system has a magnetic circuit system coupling region, and the elastic member is provided with at least two connection ends;

a shape and a structure of one connection end are configured such that the one connection end is fitted with the cup coupling region when coupling the one connection end and the cup coupling region;

a shape and a structure of another connection end are configured such that the another connection end is fitted with the magnetic circuit system coupling region when coupling the another connection end and the magnetic circuit system coupling region.

In some embodiments of the present disclosure, the jointing region has an arc-shaped structure, and the jointing region extends from the connection end in a direction away from the component to be connected.

In some embodiments of the present disclosure, the connection end of the elastic member is connected with the component to be connected by coating conductive adhesive or welding.

In some embodiments of the present disclosure, the elastic member has a linear structure, the connection end is configured in a linear shape, an outer contour of a region where the component to be connected is coupled with the connection end is configured in a linear shape, and the jointing region is configured in a linear shape;

or, the elastic member is formed by punching in a sheet-like structure, the connection end is configured in a sheet-like shape, an outer contour of the region where the component to be connected is coupled with the connection end is configured in a sheet-like shape, and the jointing region is configured in a sheet-like shape.

In some embodiments of the present disclosure, the voice coil assembly includes a voice coil bobbin and a voice coil wire surrounded on an outside of the voice coil bobbin, and when the elastic member is connected with the voice coil assembly, the elastic member is connected to the voice coil bobbin;

or, the voice coil assembly includes a voice coil bobbin and a voice coil wire surrounded on the outside of the voice coil bobbin, and the elastic member is connected to the voice coil wire.

In some embodiments of the present disclosure, the elastic member includes:

a first connection portion, the first connection portion is electrically connected with the component to be connected, and the first connection portion is the connection end;

a second connection portion, the second connection portion is used to fix the elastic member, and/or the second connection portion is the connection end; and a deformation portion, the deformation portion connects the first connection portion and the second connection portion, at least part of the deformation portion has a structure formed by winding, the gap is formed between a side of the deformation portion close to the component to be connected and the component to be connected, and a region where the deformation portion is jointed with the first connection portion forms a jointing region;

the buffer part is disposed within the gap and abuts against the deformation portion and the component to be connected.

In some embodiments of the present disclosure, the deformation portion includes a first end connected with the first connection portion and a second end connected with the second connection portion, and a central area is provided between the first end and the second end;

the deformation portion is formed by extending from the first end to the central area along a first direction in a straight line and/or a curve and then extending from the central area to the second end along a direction opposite to the first direction in a straight line and/or a curve.

In some embodiments of the present disclosure, the component to be connected is configured in a circular shape, the coupling region is configured in an arc shape, the first connection portion is configured in an arc shape, and a radian of the coupling region is equal to a radian of the first connection portion.

In some embodiments of the present disclosure, the material of the buffer part includes a flexible material.

In some embodiments of the present disclosure, the flexible material includes photosensitive adhesive, glue adhesive, coating adhesive, rubber or silica gel.

In some embodiments of the present disclosure, the sound production apparatus further includes a conforming structure, the conforming structure is connected between the connection end and the coupling region, and the conforming structure is configured to be fitted with the coupling region towards a surface of the coupling region.

In some embodiments of the present disclosure, at least one of the first connection portion, the second connection portion and the deformation portion is formed by a wound linear structure; and/or, the first connection portion, the second connection portion and the deformation portion are disposed in the same plane.

In some embodiments of the present disclosure, a plurality of elastic members are provided, and a gap is formed between a side of each of the elastic members facing the component to be connected and the component to be connected;

each of the elastic members is provided with at least one buffer part, and each buffer part is disposed within one gap and fills a gap between the elastic member and the component to be connected.

The present disclosure also provides an electronic device including a sound production apparatus, the sound production apparatus includes an elastic member and a component to be connected, the elastic member includes a connection end, the component to be connected includes a coupling region, a shape and a structure of the connection end are configured such that the connection end is fitted with the coupling region when coupling the connection end and the coupling region.

The sound production apparatus of the present disclosure is provided with an elastic member and a component to be connected, and the shape and the structure of a connection end of the elastic member are configured such that the connection end of the elastic member can be fitted with a coupling region of the component to be connected for coupling with the connection end when coupling the connection end and the component to be connected, so that the connection area between the component to be connected and the elastic member is increased, and the component to be connected and the elastic member are closely fitted with each other at the connection, thereby improving the effect of fixing the component to be connected and the elastic member and improving the stability of the sound production apparatus. In this way, the technical solution of the present disclosure may enable the connection between the elastic member and the component to be connected to have a good coupling effect and improve the reliability of the sound production apparatus.

BRIEF DESCRIPTION OF THE DRAWINGS

In order to explain the technical solutions in the embodiments of the present disclosure or in the prior art more clearly, the following will briefly introduce the accompanying drawings required for the description of the embodiments or the prior art. Obviously, the drawings in the following description are merely some embodiments of the present disclosure, and for those skilled in the art, other drawings can also be obtained according to the provided drawings without any creative effort.

Figure 1:
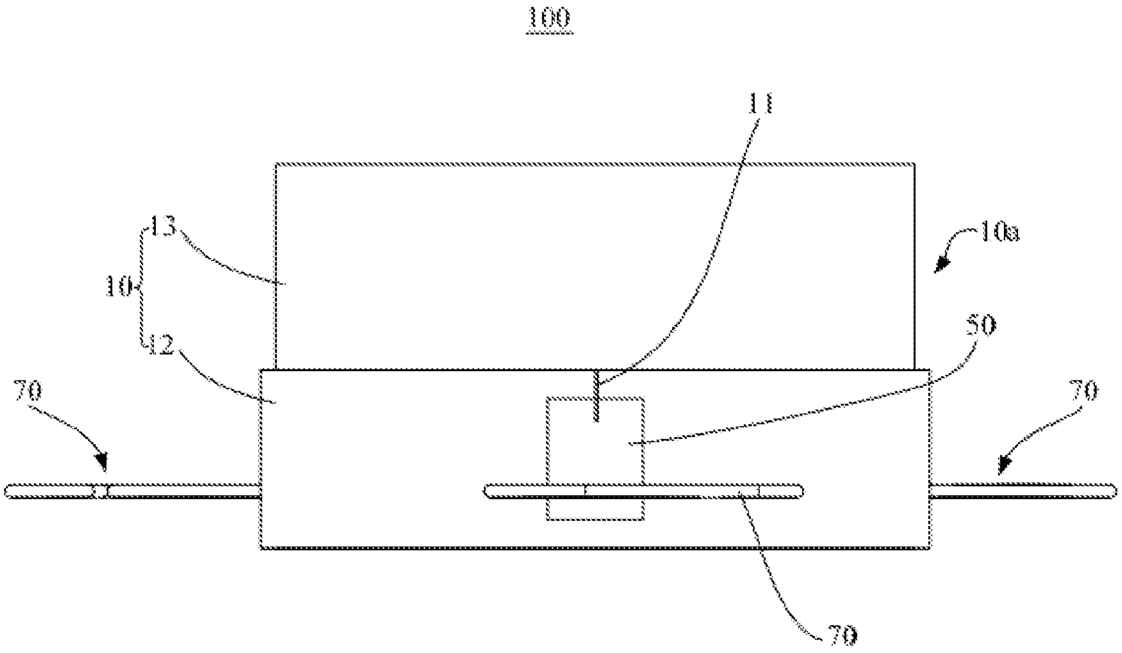
FIG. 1 is a structural schematic diagram of a sound production apparatus according to an embodiment of the present disclosure.

Reference signs:

| Reference signs | Name | Reference signs | Name |
|---|---|---|---|
| 100 | sound production apparatus | 72 | jointing region |
| 10a | component to be connected | | |
| 10a' | coupling region | | |
| 10 | voice coil assembly | 73 | second connection portion |
| 11 | lead wire | 75 | deformation portion |
| 12 | voice coil wire | 80 | buffer part |
| 13 | voice coil bobbin | 80a | holder |
| 30 | conforming structure | 90 | vibration unit |
| 50 | pad | 91 | diaphragm |
| 60 | gap | 92 | cup |
| 70 | elastic member | 101 | magnetic circuit system |
| 71 | first connection portion, connection end | 1011 | magnetic gap |

The realization, functional characteristics and advantages of the present disclosure will be further described with reference to the accompanying drawings in combination with the embodiments.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only part of the embodiments of the present disclosure, rather than all the embodiments. Based on the embodiments in the present disclosure, all other embodiments obtained by persons of ordinary skill in the art without creative efforts shall fall within the protection scope of the present disclosure.

It should be noted that all directional indications (such as up, down, left, right, front, back, etc.) in the embodiments of the present disclosure are only used to explain the relative position relationship, motion, etc. between components in a specific view position (as shown in the figure), and if the specific view position changes, the directional indication will change accordingly.

In addition, descriptions such as "first", "second", etc. in the present disclosure are only for descriptive purposes, and should not be construed as indicating or implying their relative importance or implicitly indicating the number of indicated technical features. Thus, features defined with "first" and "second" may explicitly or implicitly include at least one such feature. In addition, the technical solutions of various embodiments of the present disclosure can be combined with each other, but the combination must be based on the realization by those of ordinary skill in the art. When the combination of technical solutions is contradictory or impossible, it should be considered that the combination of such technical solutions does not exist, nor is it within the scope of protection claimed by the present disclosure.

In the present disclosure, unless otherwise expressly specified and limited, the terms "connected", "fixed", etc. should be understood in a broad sense. For example, "fixed" may refer to a fixed connection, a detachable connection, or may be integrated; may refer to a mechanical connection or an electrical connection; may be directly connected or indirectly connected through an intermediate medium; and it can be an internal communication between two elements or an interaction relationship between two elements, unless otherwise specified. For those of ordinary skill in the art, the specific meanings of the above terms in the present disclosure can be understood according to specific situations.

Referring to FIGS. 1 to 8, the present disclosure provides a sound production apparatus 100 including an elastic member 70 and a component to be connected 10*a*, the elastic member 70 includes a connection end 71, the component to be connected 10*a* includes a coupling region 10*a*', and the shape and the structure of the connection end 71 are configured such that the connection end 71 is fitted with the coupling region 10*a*' when coupling the connection end 71 and the coupling region 10*a*'.

In an embodiment, the sound production apparatus 100 includes a vibration unit 90, a magnetic circuit system 101, and a holder 80*a* for mounting and fixing the vibration unit 90 and the magnetic circuit system 101; wherein, the vibration unit 90 includes a diaphragm 91 and a voice coil assembly 10 coupled below the diaphragm 91; the magnetic circuit system 101 includes an upper magnetic guide plate, a magnet and a lower magnetic guide plate, wherein the upper magnetic guide plate and the lower magnetic guide plate are magnetic conductive structures, which are used to correct the magnetic lines of force generated by the magnet; the magnetic circuit system 101 forms a magnetic gap 1011, and the voice coil assembly 10 is disposed in the magnetic gap 1011 of the magnetic circuit system 101. The lower magnetic guide plate of the present disclosure may be a U-shaped structure, which includes a bottom wall and a side wall, a magnetic gap 1011 is formed between the upper magnetic guide plate, the magnet and the side wall of the lower magnetic guide plate, a relatively uniform magnetic field is formed in the magnetic gap 1011, and the voice coil assembly 10 is disposed in the magnetic gap 1011 having a relatively uniform magnetic field. The voice coil assembly 10 is generally formed by winding a metal wire, and the voice coil assembly 10 vibrates up and down under the action of the ampere force in the magnetic field when it is supplied with an electrical signal. The vibration direction of the voice coil assembly 10 is indicated by a vertical direction or an up and down direction, and a direction perpendicular to the vibration of the voice coil assembly 10 is indicated by a horizontal direction; since the diaphragm 91 and the voice coil assembly 10 are fixed and integrated by bonding or other means, the voice coil assembly 10 may also drive the diaphragm 91 to vibrate when it vibrates up and down according to the electrical signal, thereby producing sound waves.

However, since the magnetic field in the magnetic gap 1011 is relatively but not absolutely uniform, the position of the voice coil assembly 10 may also change during the vibration of the voice coil assembly 10, and the magnetic lines of force above the magnetic gap 1011 are arc-shaped lines, thus the ampere force exerted on the voice coil assembly 10 is not only in the vertical direction, but also includes the ampere force in other directions, which causes the voice coil assembly 10 to be prone to polarization in a non-vertical direction during the vibration and may further affect the vibration of the diaphragm 91.

In order to prevent the above-mentioned polarization, the elastic member 70 connecting the voice coil assembly 10 and the holder 80*a* may be provided to perform centering support on the polarization of the voice coil assembly 10, that is, ensure that the voice coil assembly 10 vibrates in the vibration direction within the magnetic gap 1011. In an embodiment, the elastic member 70 is a centering support piece or a flat spring.

Figure 7:
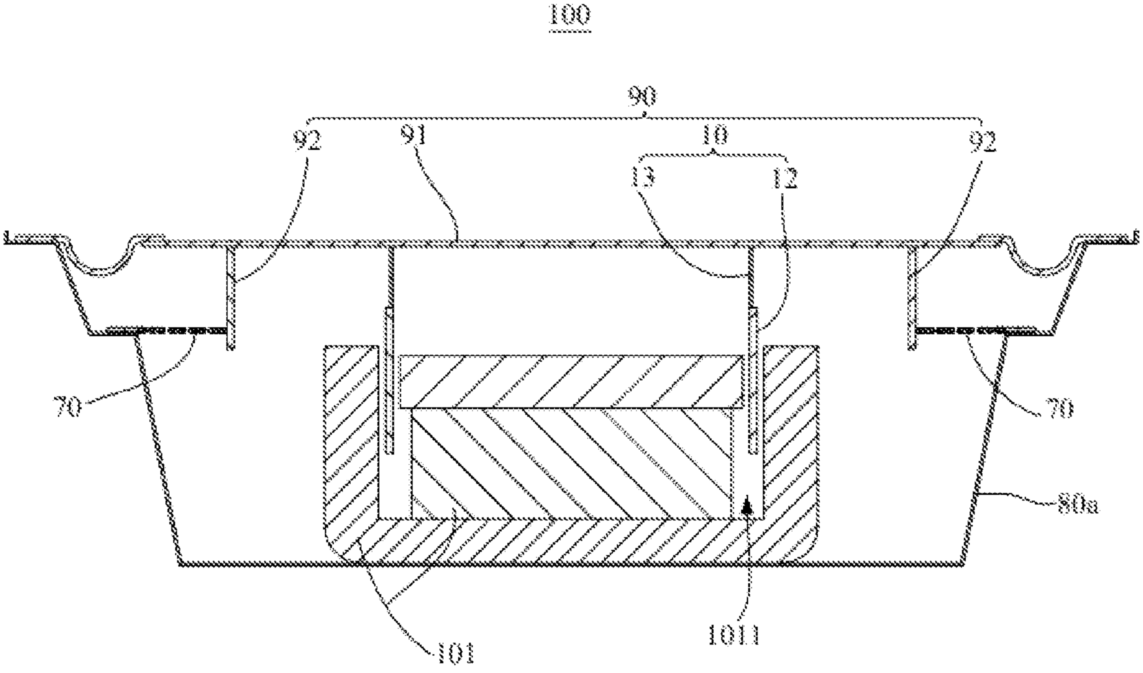
FIG. 7 is a structural schematic diagram of the sound production apparatus according to another embodiment of the present disclosure.

Referring to FIG. 7, in an embodiment, the vibration unit 90 further includes a cup 92 provided on the diaphragm 91, the cup 92 and the voice coil are disposed on the same side of the diaphragm 91, and the cup 92 is disposed around the voice coil; when the magnetic gap 1011 is provided, the cup 92 is positioned outside the magnetic gap 1011, the elastic member 70 connecting the cup 92 and the holder 80*a* may be provided to perform centering support on the polarization of the voice coil, that is, ensure that the voice coil vibrates in the vibration direction within the magnetic gap 1011.

In an embodiment, the holder 80*a* is a housing or a magnetic yoke. Since the housing may be used to support the loudspeaker unit, providing the holder 80*a* as a housing can facilitate to fix the side of the elastic member 70 away from the vibration unit 90 and improve the centering support effect of the elastic member 70. Since most portion of the vibration unit 90 is close to the magnetic gap 1011, the vibration unit 90 is close to the magnetic yoke, so that connecting the side of the elastic member 70 away from the vibration unit 90 to the magnetic yoke can save the distance for arranging the elastic member 70, and on the other hand, it can improve the centering support effect of the elastic member 70. It should be noted that the fixing methods of the elastic member 70 in the embodiment include various combinations: the elastic member 70 connecting the voice coil and the housing, the elastic member 70 connecting the voice coil and the magnetic yoke, the elastic member 70 connecting the cup 92 and the housing, and the elastic member 70 connecting the cup 92 and the magnetic yoke, all of which can well ensure the centering support effect of the elastic member 70.

In some embodiments of the present disclosure, the voice coil assembly 10 may be provided with a pad 50, the voice coil assembly 10 is also provided with a lead wire 11 connected to the pad 50. A side of the elastic member 70 facing the voice coil assembly 10 is connected to the pad 50. In an embodiment, the pad 50 may be copper foil, the copper foil has low surface oxygen characteristics, can be attached to various base materials such as metals, insulating materials, etc., and has a wide temperature range, so that it can be well fixed at a position to be fixed, and it is convenient to connect the voice coil assembly 10 and the elastic member 70.

In an embodiment, an outer contour of the pad 50 is configured in a polygon, or in a circle or ellipse, as long as it is convenient to connect the voice coil assembly 10 with the elastic member 70.

The sound production apparatus 100 of the present disclosure is provided with the elastic member 70 and the component to be connected 10*a*, and the shape and the structure of the connection end 71 of the elastic member 70 are configured such that the connection end 71 of the elastic member 70 can be fitted with the coupling region 10*a*' of the component to be connected 10*a* for coupling with the connection end 71 when coupling the connection end 71 and the component to be connected 10*a*. As such, the connection area between the component to be connected 10*a* and the elastic member 70 is increased, and the component to be connected 10*a* and the elastic member 70 are closely fitted with each other at the connection, so that the effect of fixing the component to be connected 10*a* and the elastic member 70 is improved, and the stability of the sound production apparatus 100 is improved. In this way, the technical solution of the present disclosure may enable the connection between the elastic member 70 and the component to be connected 10*a* to have a good coupling effect and improve the reliability of the sound production apparatus 100.

It should be noted that, "fit" means that a bonding surface of the connection end 71 is bonded with the coupling region 10*a*'. The following illustrates the form of "fit" by way of examples. In an embodiment, a region of the component to be connected 10*a* for coupling with the connection end 71 may be provided as a concave arc-shaped surface, in this case, a surface of the connection end 71 for fitting with the component to be connected 10*a* may be provided as a convex arc-shaped surface. In an embodiment, the region of the component to be connected 10*a* for coupling with the connection end 71 may be provided as a wavy surface, in this case, the surface of the connection end 71 for fitting with the component to be connected 10*a* may also be provided as a wavy surface. In an embodiment, the region of the component to be connected 10*a* for coupling with the connection end 71 may be provided as a surface with a plurality of concave holes, in this case, the surface of the connection end 71 for fitting with the component to be connected 10*a* may be provided as a surface with a plurality of convex points. In an embodiment, when the contour of the surface of the connection end 71 for fitting with the component to be connected 10*a* is circular, the surface to be fitted of the component to be connected 10*a* may be circular; and when the contour of the surface of the connection end 71 for fitting with the component to be connected 10*a* is polygonal, the surface to be fitted of the component to be connected 10*a* may be configured in a polygon, so that the connection end 71 can be fitted with the region of the component to be connected 10*a* for coupling with the connection end 71 when coupling the connection end 71 and the component to be connected 10*a*. In an embodiment, the region of the component to be connected 10*a* for coupling with the connection end 71 may be provided as a surface with a plurality of grooves, in this case, the surface of the connection end 71 for fitting with the component to be connected 10*a* may be provided as a surface with a plurality of bumps.

Referring to FIG. 1, in some embodiments of the present disclosure, the component to be connected 10*a* includes a voice coil assembly 10, the voice coil assembly 10 has a voice coil assembly coupling region 10*a*', and the shape and the structure of the connection end 71 are configured such that the connection end 71 is fitted with the voice coil assembly coupling region 10*a*' when coupling the connection end 71 and the voice coil assembly coupling region 10*a*'; in this embodiment, the component to be connected 10*a* includes a voice coil assembly 10, in this case, the elastic member 70 can be understood as a centering support piece or a flat spring, and by providing the centering support piece or flat spring with a connection end 71 that is fitted with the voice coil assembly coupling region 10*a*', the effect of connecting the voice coil assembly 10 and the elastic member 70 is ensured, so that a good effect of connecting the voice coil assembly 10 with the elastic member 70 can be maintained even when the voice coil assembly 10 generates a large displacement, and thus the operation stability of the sound production apparatus 100 can be ensured.

And/or, the component to be connected 10*a* includes a housing, the housing has a housing coupling region 10*a*', and the shape and the structure of the connection end 71 are configured such that the connection end 71 is fitted with the housing coupling region 10*a*' when coupling the connection end 71 and the housing coupling region 10*a*'; in this embodiment, the component to be connected 10*a* includes a housing, in this case, the elastic member 70 can be understood as a centering support piece or a flat spring, and by providing the centering support piece or flat spring with the connection end 71 that is fitted with the housing coupling region 10*a*', the effect of connecting the housing and the elastic member 70 is ensured, so that a good effect of connecting the elastic member 70 with the housing can be maintained even when the elastic member 70 is pulled by other components (such as a voice coil, a diaphragm 91, or a cup 92) and generates a large displacement, and thus the operation stability of the sound production apparatus 100 can be ensured.

Or, the component to be connected 10*a* includes a voice coil assembly 10 and a housing, the voice coil assembly 10 has a voice coil assembly coupling region 10*a*', the housing has a housing coupling region 10*a*', and the elastic member 70 is provided with at least two connection ends 71; the shape and the structure of one connection end 71 are configured such that the one connection end 71 is fitted with the voice coil assembly coupling region 10*a*' when coupling the one connection end 71 and the voice coil assembly coupling region 10*a'*;

the shape and the structure of another connection end 71 are configured such that the another connection end 71 is fitted with the housing coupling region 10*a*' when coupling the another connection end 71 and the housing coupling region 10*a*'. In this embodiment, the component to be connected 10*a* includes a voice coil assembly 10 and a housing, in this case, the elastic member 70 can be understood as a centering support piece or a flat spring. By providing the centering support piece or flat spring with two connection ends 71 that are respectively fitted with the voice coil assembly coupling region 10*a*' and the housing coupling region 10*a*', the effect of connecting the voice coil assembly 10 and the elastic member 70 is ensured, so that a good effect of connecting the voice coil assembly 10 with the elastic member 70 can be maintained even when the voice coil assembly 10 generates a large displacement, and thus the operation stability of the sound production apparatus 100 can be ensured; and on the other hand, the effect of connecting the housing and the elastic member 70 is ensured, so that a good effect of connecting the elastic member 70 with the housing can be maintained even when the elastic member 70 is pulled by other components (such as a voice coil, a diaphragm 91, or a cup 92) and generates a large displacement, and thus the operation stability of the sound production apparatus 100 can be ensured.

In some embodiments of the present disclosure, the component to be connected 10*a* includes a cup 92, the cup 92 has a cup coupling region 10*a*', the shape and the structure of the connection end 71 are configured such that the connection end 71 is fitted with the cup coupling region 10*a*' when coupling the connection end 71 and the cup coupling region 10*a*'; the voice coil and the cup 92 are disposed on the same side of the diaphragm 91, and the cup 92 is disposed around the voice coil and is positioned outside the magnetic gap 1011. In this embodiment, the component to be connected 10*a* includes a cup 92, in this case, the elastic member 70 can be understood as a centering support piece or a flat spring, and by providing the centering support piece or flat spring with the connection end 71 that is fitted with the cup coupling region 10*a*', the effect of connecting the cup 92 and the elastic member 70 is ensured, so that a good effect of connecting the cup 92 with the elastic member 70 can be maintained even when the cup 92 generates a large displacement, and thus the operation stability of the sound production apparatus 100 can be ensured.

And/or, the component to be connected 10*a* includes a housing, the housing has a housing coupling region 10*a*', and the shape and the structure of the connection end 71 are configured such that the connection end 71 is fitted with the housing coupling region 10*a*' when coupling the connection end 71 and the housing coupling region 10*a*'. In this embodiment, the component to be connected 10*a* includes a housing, in this case, the elastic member 70 can be understood as a centering support piece or a flat spring, and by providing the centering support piece or flat spring with the connection end 71 that is fitted with the housing coupling region 10*a*', the effect of connecting the housing and the elastic member 70 is ensured, so that a good effect of connecting the elastic member 70 with the housing can be maintained even when the elastic member 70 is pulled by other components (such as a voice coil, a diaphragm 91, or cup 92) and generates a large displacement, and thus the operation stability of the sound production apparatus 100 can be ensured.

Or, the component to be connected 10*a* includes a cup 92 and a housing, the cup 92 has a cup coupling region 10*a*', the housing has a housing coupling region 10*a*', and the elastic member 70 is provided with at least two connection ends 71;

the shape and the structure of one connection end 71 are configured such that the one connection end 71 is fitted with the cup coupling region 10*a*' when coupling the one connection end 71 and the cup coupling region 10*a'*;

the shape and the structure of another connection end 71 are configured such that the another connection end 71 is fitted with the housing coupling region 10*a*' when coupling the another connection end 71 and the housing coupling region 10*a*'. In this embodiment, the component to be connected 10*a* includes a cup 92 and a housing, in this case, the elastic member 70 can be understood as a centering support piece or a flat spring. By providing the centering support piece or flat spring with two connection ends 71 that are respectively fitted with the cup coupling region 10*a*' and the housing coupling region 10*a*', the effect of connecting the cup 92 and the elastic member 70 is ensured, so that a good effect of connecting the cup 92 with the elastic member 70 can be maintained even when the cup 92 generates a large displacement, and thus the operation stability of the sound production apparatus 100 can be ensured; and on the other hand, the effect of connecting the housing and the elastic member 70 is ensured, so that a good effect of connecting the elastic member 70 with the housing can be maintained even when the elastic member 70 is pulled by other components (such as a voice coil, a diaphragm 91 or a cup 92) and generates a large displacement, and thus the operation stability of the sound production apparatus 100 can be ensured.

In some embodiments of the present disclosure, the component to be connected 10*a* includes a cup 92, the cup 92 has a cup coupling region 10*a*', the shape and the structure of the connection end 71 are configured such that the connection end 71 is fitted with the cup coupling region 10*a*' when coupling the connection end 71 and the cup coupling region 10*a*'. In the embodiment, the component to be connected 10*a* includes a cup 92, in this case, the elastic member 70 can be understood as a centering support piece or a flat spring, and by providing the centering support piece or flat spring with the connection end 71 that is fitted with the cup coupling region 10*a*', the effect of connecting the cup 92 and the elastic member 70 is ensured, so that a good effect of connecting the cup 92 with the elastic member 70 can be maintained even when the cup 92 generates a large displacement, and thus the operation stability of the sound production apparatus 100 can be ensured.

And/or, the component to be connected 10*a* includes a magnetic circuit system 101, the magnetic circuit system 101 has a magnetic circuit system coupling region 10*a*', and the shape and the structure of the connection end 71 are configured such that the connection end 71 is fitted with the magnetic circuit system coupling region 10*a*' when coupling the connection end 71 and the magnetic circuit system coupling region 10*a*'; in this embodiment, the component to be connected 10*a* includes a magnetic circuit system 101, in this case, the elastic member 70 can be understood as a centering support piece or a flat spring, and by providing the centering support piece or flat spring with the connection end 71 that is fitted with the magnetic circuit system coupling region 10*a*', the effect of connecting the magnetic circuit system 101 and the elastic member 70 is ensured, so that a good effect of connecting the magnetic circuit system 101 with the elastic member 70 can be maintained even when the elastic member 70 is pulled by other components (such as a voice coil, a diaphragm 91, or cup 92) and generates a large displacement, and thus the operation stability of the sound production apparatus 100 can be ensured.

Or, the component to be connected 10*a* includes a cup 92 and a magnetic circuit system 101, the cup 92 has a cup coupling region 10*a*', the magnetic circuit system 101 has a magnetic circuit system coupling region 10*a*', and the elastic member 70 is provided with at least two connection ends 71;

the shape and the structure of one connection end 71 are configured such that the one connection end 71 is fitted with the cup coupling region 10*a*' when coupling the one connection end 71 and the cup coupling region 10*a*';

the shape and the structure of another connection end 71 are configured such that the another connection end 71 is fitted with the magnetic circuit system coupling region 10*a*' when coupling the another connection end 71 and the magnetic circuit system coupling region 10*a*'. In this embodiment, the component to be connected 10*a* includes a cup 92 and a magnetic circuit system 101, in this case, the elastic member 70 can be understood as a centering support piece or a flat spring. By providing the centering support piece or flat spring with two connection ends 71 that are respectively fitted with the cup coupling region 10*a*' and the magnetic circuit system coupling region 10*a*', the effect of connecting the cup 92 and the elastic member 70 is ensured, so that a good effect of connecting the cup 92 with the elastic member 70 can be maintained even when the cup 92 generates a large displacement, and thus the operation stability of the sound production apparatus 100 can be ensured; and on the other hand, the effect of connecting the magnetic circuit system 101 and the elastic member 70 is ensured, so that a good effect of connecting the elastic member 70 with the magnetic circuit system 101 can be maintained even when the elastic member 70 is pulled by other components (such as a voice coil, a diaphragm 91 or a cup 92) and generates a large displacement, and thus the operation stability of the sound production apparatus 100 can be ensured.

In an embodiment of the present disclosure, the component to be connected 10*a* includes a voice coil assembly 10 and a magnetic circuit system 101, the voice coil assembly 10 has a voice coil assembly coupling region 10*a*', the magnetic circuit system 101 has a magnetic circuit system coupling region 10*a*', and the elastic member 70 is provided with at least two connection ends 71; the shape and the structure of one connection end 71 are configured such that the one connection end 71 is fitted with the voice coil assembly coupling region 10*a*' when coupling the one connection end 71 and the voice coil assembly coupling region 10*a*';

the shape and the structure of another connection end 71 are configured such that the another connection end 71 is fitted with the magnetic circuit system coupling region 10*a*' when coupling the another connection end 71 and the magnetic circuit system coupling region 10*a*'. In this embodiment, the component to be connected 10*a* includes a voice coil assembly 10 and a magnetic circuit system 101, in this case, the elastic member 70 can be understood as a centering support piece or a flat spring. By providing the centering support piece or flat spring with two connection ends 71 that are respectively fitted with the voice coil assembly coupling region 10*a*' and the magnetic circuit system coupling region 10*a*', the effect of connecting the voice coil assembly 10 and the elastic member 70 is ensured, so that a good effect of connecting the voice coil assembly 10 with the elastic member 70 can be maintained even when the voice coil assembly 10 generates a large displacement, and thus the operation stability of the sound production apparatus 100 can be ensured; and on the other hand, the effect of connecting the magnetic circuit system 101 and the elastic member 70 is ensured, so that a good effect of connecting the elastic member 70 with the magnetic circuit system 101 can be maintained even when the elastic member 70 is pulled by other components (such as a voice coil, a diaphragm 91 or a cup 92) and generates a large displacement, and thus the operation stability of the sound production apparatus 100 can be ensured.

Figure 4:
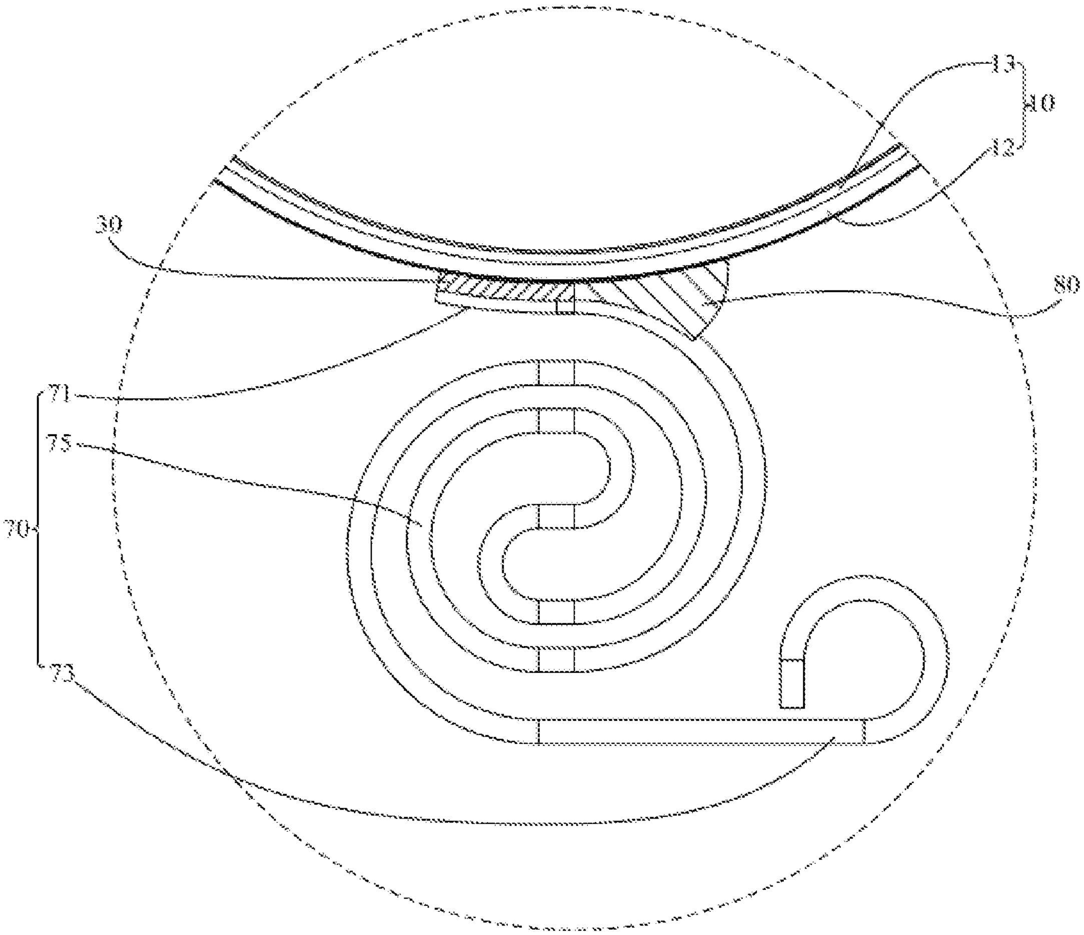
FIG. 4 is a partial schematic diagram showing the A portion in FIG. 2.
Figure 5:
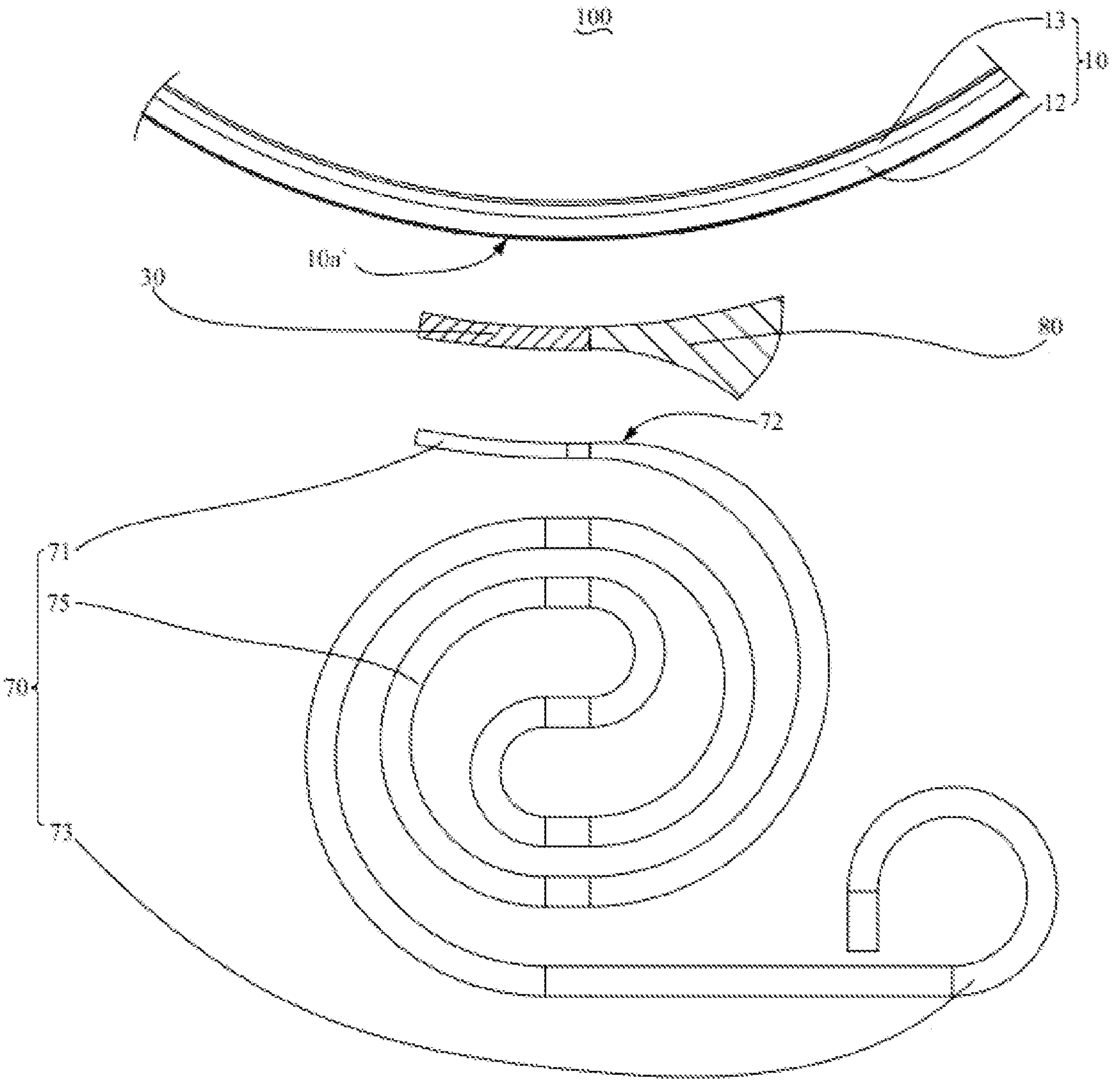
FIG. 5 is an exploded schematic diagram of the sound production apparatus according to an embodiment of the present disclosure.
Figure 6:
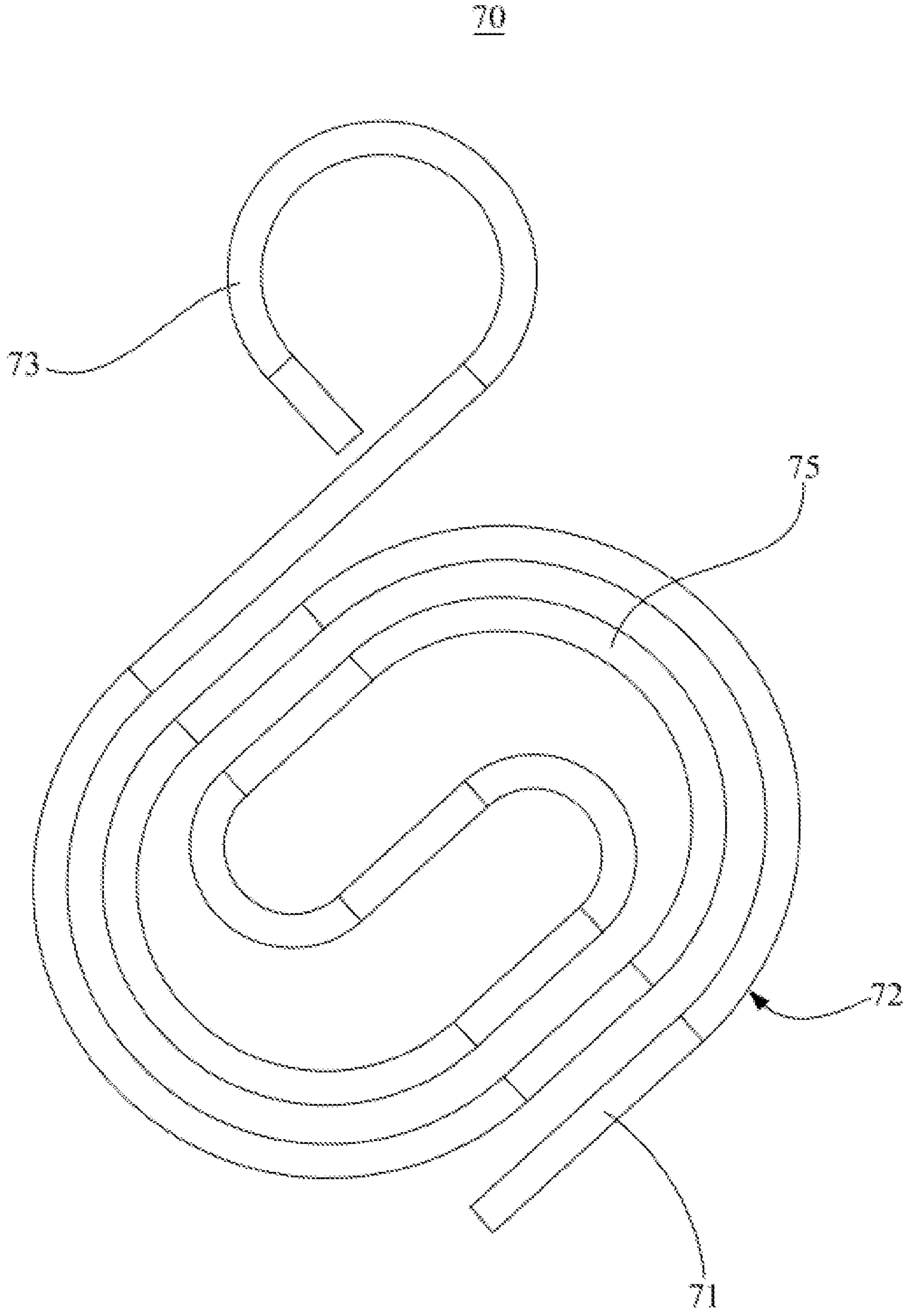
FIG. 6 is a structural schematic diagram of an elastic member of the sound production apparatus according to an embodiment of the present disclosure.

Referring to FIGS. 4 to 6, in some embodiments of the present disclosure, the elastic member 70 further includes a jointing region 72 away from the connection end 71 and jointed with the connection end 71, a gap 60 is provided between the jointing region 72 and the component to be connected 10*a*, a buffer part 80 is disposed within the gap 60, and the buffer part 80 fills the gap 60 between the jointing region 72 and the component to be connected 10*a*. In this embodiment, by providing the jointing region 72, the elastic member 70 is fixed through the connection end 71, and since a length of the elastic member 70 is extended, the elastic member 70 has a good elastic deformation, which is convenient for the elastic member 70 to perform centering support on the component to be connected 10*a*. Furthermore, since the buffer part 80 is provided, the connection area between the component to be connected 10*a* and the elastic member 70 is increased, and the effect of fixing the component to be connected 10*a* with the elastic member 70 is improved, and on the other hand, when the elastic member 70 is subjected to a large force to generate a large displacement, it is buffered and supported by the buffer part 80, which reduces the force on the connection between the elastic member 70 and the component to be connected 10*a*, reduces the fatigue at the connection, and improves the stability of the sound production apparatus 100.

In some embodiments of the present disclosure, the jointing region 72 has an arc-shaped structure, and the jointing region 72 extends from the connection end 71 in a direction away from the component to be connected 10*a*. At the same linear distance, the arc-shaped structure has a better elastic deformation. By configuring the jointing region 72 into the arc-shaped structure, the elastic deformation of the elastic member 70 is improved. On the other hand, the connection region 72 is configured into the arc-shaped structure so that a width of the gap 60 gradually changes from the connection to the direction away from the connection, and when the buffer member 80 is disposed within the gap 60, a width of the buffer part 80 is smoothly transitioned, thereby improving the buffering and support effects of the buffer part 80.

In some embodiments of the present disclosure, the connection end 71 of the elastic member 70 is connected with the component to be connected 10*a* by coating conductive adhesive or welding. The fixing method of welding has low production cost and can ensure a good yield. The use of conductive glue or conductive solid adhesive for bonding the elastic member 70 and the component to be connected 10*a* can ensure a good bonding effect, produces less residual material, and it is convenient for production.

Referring to FIGS. 5 to 7, in some embodiments of the present disclosure, the elastic member 70 has a linear structure, the connection end 71 is configured in a linear shape, an outer contour of a region where the component to be connected is coupled with the connection end is configured in a linear shape, and the jointing region 72 is configured in a linear shape. It should be noted that the linear structure is an elongated structure, and its shape is similar to an elongated object made of silk, cotton, linen or metal, such as silk thread, cotton thread, wool thread, gold thread, etc. A cross-section width of the linear structure is much smaller than a length thereof. In the embodiment, the outer contour is configured in a linear shape, that is, the outer contour is an elongated contour, and since an elongated structure has a good elastic deformation function, providing the elastic member 70 and the jointing region 72 as a linear structure can improve its centering support effect on the component to be connected 10*a*.

In some embodiments of the present disclosure, the elastic member 70 has a sheet-like structure, the connection end 71 is configured in a sheet-like shape, an outer contour of the region where the component to be connected 10*a* is coupled with the connection end 71 is configured in a sheet-like shape, and the jointing region 72 is configured in a sheet-like shape. It should be noted that in the embodiment, the sheet-like structure can be understood as a structure formed by a number of linear structures arranged in parallel, and can be understood as a structure formed by a combination of a number of elongated objects, it is similar to a case that a silk surface is formed by silk threads side by side. Such configuration can allow the elastic member 70 to have good structural strength on the premise of having a certain degree of elastic deformation. Providing the elastic member 70 and the jointing region 72 as a sheet-like structure can improve the stability of its centering support to the component to be connected 10*a*. Also, configuring the jointing region 72 in a sheet-like shape can increase the contact area between the buffer part 80 and the jointing region 72 to improve the adhesion effect.

In some embodiments of the present disclosure, when the elastic member 70 is connected with the voice coil assembly 10, the voice coil assembly 10 includes a voice coil bobbin 13 and a voice coil wire 12 surrounded on an outside of the voice coil bobbin 13, and the elastic member 70 is connected to the voice coil bobbin 13. In the embodiment, a pad 50 may be disposed on the voice coil bobbin 13, and then the connection end 71 of the elastic member 70 may be connected to the pad 50. It will be understood that the connection end 71 of the elastic member 70 is configured in a shape adapted to the pad 50, and the specific embodiment refers to the above, as such, the elastic member 70 and the voice coil bobbin 13 can be well connected, and it is convenient to supply power to the voice coil wire 12.

Referring to FIGS. 1 and 4, in some embodiments of the present disclosure, the voice coil assembly 10 includes a voice coil bobbin 13 and a voice coil wire 12 surrounded on an outside of the voice coil bobbin 13, and the elastic member 70 is connected to the voice coil wire 12. In the embodiment, a pad 50 may be disposed on the voice coil wire 12, and then the connection end 71 of the elastic member 70 may be connected to the pad 50. It will be understood that the connection end 71 of the elastic member 70 is configured in a shape adapted to the pad 50, and the specific embodiment refers to the above, as such, the elastic member 70 and the voice coil wire 12 can be well connected, and it is convenient to supply power to the voice coil wire 12.

In some embodiments, the elastic member 70 includes a conductive material, and specifically a metal material. Such configuration enables the elastic member 70 to supply power to the voice coil assembly 10. When the elastic member 70 has a plurality of elastic members, some the elastic members 70 can be made of a conductive material, and other elastic members 70 can be made of other materials such as non-magnetic conductive materials, plastics, etc., as long as it is convenient for supplying power and centering support.

In some embodiments of the present disclosure, the elastic member 70 is a structure formed of an elastic material, and the conductive material is formed on a surface of the elastic member 70 by electroplating to form a metal coating; or, the conductive material is formed on the surface of the elastic member 70 by composite/etching to form a metal film layer; the metal coating/metal film layer forms a conductive path connecting an external circuit and the voice coil assembly 10. Such configuration can achieve good power supply, and on the other hand, allows the elastic member 70 to have good structural strength and elastic deformation.

Figure 2:
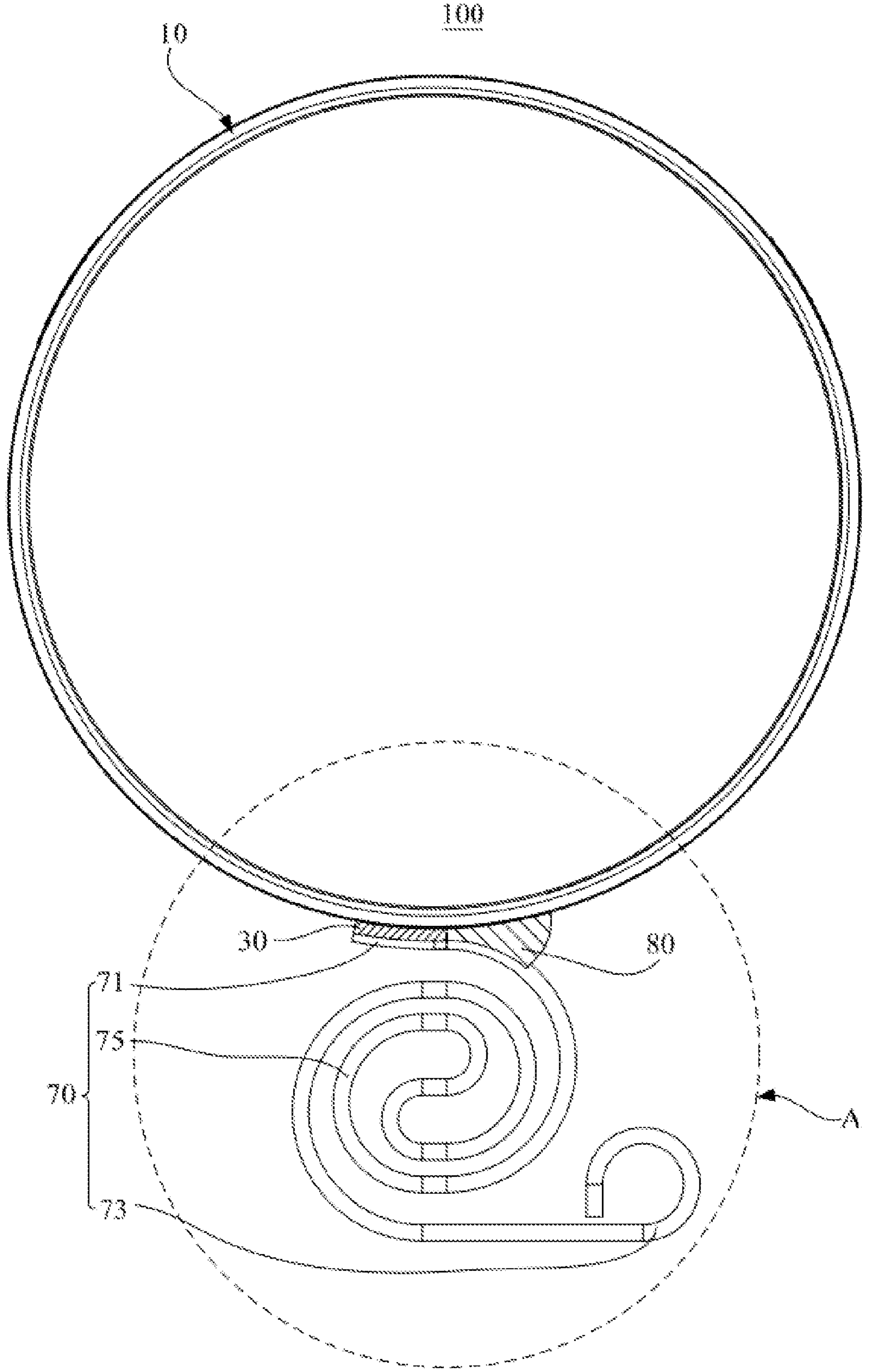
FIG. 2 is a top view of the sound production apparatus according to an embodiment of the present disclosure.
Figure 3:
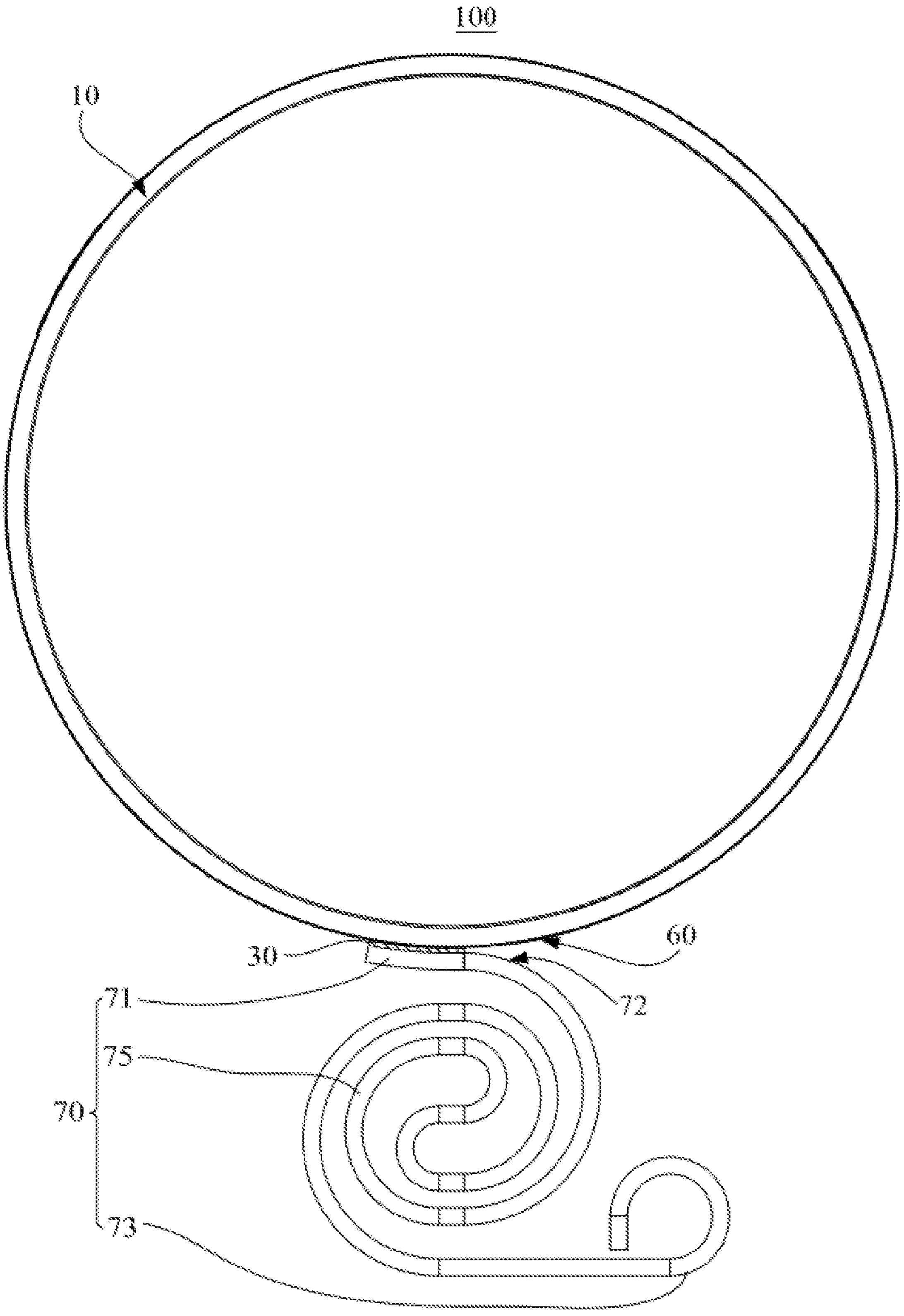
FIG. 3 is a top view of the sound production apparatus not provided with a buffer part according to an embodiment of the present disclosure.

Referring to FIGS. 2 and 4, in some embodiments of the present disclosure, the elastic member 70 includes:

a first connection portion 71, the first connection portion 71 is electrically connected with the component to be connected 10*a*, and the first connection portion 71 is the connection end 71; a second connection portion 73, the second connection portion 73 is used to fix the elastic member 70, and/or the second connection portion 73 is the connection end 71; and a deformation portion 75, the deformation portion 75 electrically connects the first connection portion 71 and the second connection portion 73, the deformation portion 75 is configured in a helical structure, the gap 60 is formed between a side of the deformation portion 75 close to the component to be connected 10*a* and the component to be connected 10*a*, a region where the deformation portion 75 is jointed with the first connection portion 71 forms a jointing region 72; the buffer part 80 is provided within the gap 60 and abuts against the deformation portion 75 and the voice coil assembly 10.

The elastic member 70 is connected and fitted with the component to be connected 10*a* through the first connection portion 71; in addition, the elastic member 70 restricts the reciprocating vibration of the component to be connected 10*a* according to the vibration offset state of the component to be connected 10*a* through the elastic deformation effect of the deformation portion 75, so that the component to be connected 10*a* is stabilized in a predetermined central area, the polarization of the component to be connected 10*a* is prevented, and thus the reciprocating vibration of the component to be connected 10*a* is more stable.

In the embodiment, at least part of the elastic member 70 is formed by bending a long strip structure, that is, at least one of the first connection portion 71, the second connection portion 73 and the deformation portion 75 is formed by bending a long strip structure. The long strip part has better elastic deformation, is easy to manufacture, and can provide good compliance when the component to be connected 10*a* has a large vibration displacement. It will be understood that the elastic member 70 may be a combination of a long strip bending structure and a plate-shaped structure, or may be formed by bending a long strip structure as a whole, or may be a combination of a long strip bending structure and a ribbon bending structure.

In the embodiment, the jointing region 72 is a region where the deformation portion 75 is jointed with the first connection portion 71, this configuration enables the buffer part 80, which is disposed within the gap 60 formed between the jointing region 72 and the component to be connected 10*a*, to directly reinforce and support the connection between the first connection portion 71 (connection end 71) and the component to be connected 10*a*, effectively improving the fixing effect of the elastic member 70 on the component to be connected 10*a*.

Furthermore, the deformation portion 75 of the elastic member 70 has a planar structure, and the deformation portion 75 is located in the same horizontal plane with the first connection portion 71 and the second connection portion 73, so that the elastic member 70 has a planar structure as a whole. Compared with the existing sheet-shaped elastic wave shape elastic member 70, the present embodiment improves the overall flatness of the elastic member 70, and further reduces the height of the sound production apparatus 100 in the vertical direction, and realizes the design concept of thinning the products.

The deformation portion 75 of the helical structure has a large elastic deformation amount, which can better perform the centering with respect to the vibration of the component to be connected 10*a*. Also, since the first connection portion 71 is rigidly connected with the component to be connected 10*a*, by providing the buffer part 80, when the elastic member 70 is pulled as it performs the centering to the component to be connected 10*a*, the connection between the first connection portion 71 and the component to be connected 10*a* can be buffered by the buffer part 80 so as to ensure the effect of connecting the first connection portion 71 and the component to be connected 10*a*.

In some embodiments of the present disclosure, the component to be connected 10*a* is configured in a circular shape, the coupling region 10*a*' is configured in an arc shape, the first connection portion 71 is configured in an arc shape, and a radian of the coupling region 10*a*' is equal to a radian of the first connection portion 71. In this way, when the first connection portion 71 is connected with the coupling region 10', the first connection portion 71 is more evenly fitted and closely connected with the coupling region 10' and there is a larger fitting area, thereby improving the effect of welding and fixing the elastic member 70 and the component to be connected 10*a*. In an embodiment, the first connection portion 71 is fitted with a curved surface roughly formed in a long strip shape of the component to be connected 10*a*, and in this case, the coupling region 10*a*' may also be configured in a curved surface roughly formed in a long strip shape, so as to achieve a high degree of fitting to the elastic member 70.

In some embodiments of the present disclosure, the material of the buffer part 80 includes a flexible material. Specifically, the flexible material may be photosensitive adhesive, glue adhesive, coating adhesive, silica gel, rubber, etc. In the embodiment, a liquid colloid of the photosensitive adhesive, glue adhesive, coating adhesive, silica gel or rubber may be coated at the connection between the voice coil assembly 10 and the first connection portion 71, and the buffer 80 may be formed after curing. Coating adhesive, silica gel and rubber can deform under a very small external force and can be restored to its original state after removing the external force, which can achieve a good cushioning effect. Photosensitive adhesive is a kind of adhesive that can be cured only by irradiating ultraviolet light, and may be used as an adhesive, it is completely transparent after curing, and the product may not yellowing and whitening for a long time; compared with the conventional instant drying adhesive, it has the advantages of resistance to environmental testing, not whitening and good flexibility, and can achieve a good cushioning effect.

Referring to FIGS. 2 and 4, in some embodiments of the present disclosure, the sound production apparatus 100 further includes a conforming structure 30, the conforming structure 30 is connected between the connection end 71 and the component to be connected 10*a*, and the conforming structure 30 is configured to be fitted with the coupling region 10*a*' towards a surface of the coupling region 10*a'*.

In an embodiment, the coupling region 10*a*' is provided as a plane, in this case, the conforming structure 30 is configured to have a plane towards the surface of the voice coil assembly 10, so that the conforming structure 30 can be flatly fitted with the connection surface, thus ensuring the effect of connecting the connection end 71 and the component to be connected 10*a*. In an embodiment, the connection surface is provided as an arc-shaped surface, in this case, the conforming structure 30 is configured to have an arc-shaped surface towards the surface of the component to be connected 10*a*, and the radian of the connection surface is equal to the radian of the arc-shaped surface of the conforming structure 30, so that the conforming structure 30 can be flatly fitted with the connection surface, thus ensuring the effect of connecting the connection end 71 and the component to be connected 10*a*. In an embodiment, the conforming structure 30 may be made of a metal material so as to facilitate welding.

In some embodiments of the present disclosure, a plurality of elastic members 70 are provided, and a gap 60 is formed between a side of each of the elastic members 70 facing the component to be connected 10*a* and the component to be connected 10*a;* a plurality of buffer parts 80 are provided, and each of the buffer parts 80 is disposed within the gap 60 and abuts against the elastic member 70 and the component to be connected 10*a*; each of the elastic members 70 is at least provided with one of the buffer parts 80, each of the buffer parts 80 is disposed within the gap 60 and fills the gap 60 between the elastic member 70 and the component to be connected 10*a*. A plurality of elastic members 70 are provided so that a plurality of positions of the components to be connected 10a can be supported, ensuring the stability of the component to be connected 10a and the elastic member 70. Furthermore, a plurality of buffer parts 80 are provided so that the gaps 60 at several positions can be reinforced and supported, improving the support stability of the elastic member 70 coupled with the component to be connected 10a, and greatly increasing the operation stability of the sound production apparatus 100.

Furthermore, the voice coil assembly 10 may be designed to be circular (for example, when applied to a circular sound production apparatus 100), or may be designed to be square, runway-shaped, oval or in other shapes as required.

It will be understood that the sound production apparatus 100 may be a rectangular sound production apparatus 100 or a circular sound production apparatus 100. In the case of a rectangular sound production apparatus 100, the magnetic steel in a central portion is also provided as a long strip with a rectangular shape, and correspondingly, the sound production apparatus 100 is also in a rectangular shape. Compared to a circular sound production apparatus, such structure has higher space utilization when applied to an electronic device. Meanwhile, under the premise of the same area, the elongated diaphragm 91 is more likely to obtain larger amplitudes. The sound production apparatus 100 of the present disclosure may also be provided, as a whole, in a structure which is thinner in up and down directions. Accordingly, it is easier to be applied in a flat installation space.

The present disclosure also provides an electronic device, the electronic device includes a sound production apparatus 100 including an elastic member 70 and a component to be connected 10a, the elastic member 70 includes a connection end 71, the component to be connected 10a includes a coupling region 10a', and the shape and the structure of the connection end 71 are configured such that the connection end 71 is fitted with the coupling region 10a' when coupling the connection end 71 and the coupling region 10a'. Since the electronic device adopts all the technical solutions in the above-mentioned embodiments, it at least has all the beneficial effects brought by the technical solutions of the above embodiments, which will not be repeated here.

The above only describes the preferred embodiments of the present disclosure, and is not intended to limit the scope of the present disclosure. Any equivalent structural transformation made by using the contents of the description and drawings of the present disclosure within the inventive concept of the present disclosure, or direct/indirect application in other relevant technical fields, is included in the scope of patent protection of the present disclosure.

What is claimed is:

1. A sound production apparatus, comprising an elastic member and a component to be connected, wherein the elastic member comprises a connection end, the component to be connected comprises a coupling region, and a shape and a structure of the connection end are configured such that the connection end is fitted with the coupling region when coupling the connection end and the coupling region, wherein the elastic member further comprises a jointing region away from the connection end and jointed with the connection end, a gap is provided between the jointing region and the component to be connected, a buffer part is disposed within the gap, and the buffer part fills the gap between the jointing region and the component to be connected, wherein the material of the buffer part comprises a flexible material.

2. The sound production apparatus of claim 1, wherein the component to be connected comprises a voice coil assembly, the voice coil assembly has a voice coil assembly coupling region, and the shape and the structure of the connection end are configured such that the connection end is fitted with the voice coil assembly coupling region when coupling the connection end and the voice coil assembly coupling region, and/or wherein the component to be connected comprises a housing, the housing has a housing coupling region, and the shape and the structure of the connection end are configured such that the connection end is fitted with the housing coupling region when coupling the connection end and the housing coupling region, or wherein the component to be connected comprises a voice coil assembly and a housing, the voice coil assembly has a voice coil assembly coupling region, the housing has a housing coupling region, and the elastic member is provided with at least two connection ends, wherein a shape and a structure of one connection end are configured such that the one connection end is fitted with the voice coil assembly coupling region when coupling the one connection end and the voice coil assembly coupling region, and wherein a shape and a structure of another connection end are configured such that the another connection end is fitted with the housing coupling region when coupling the another connection end and the housing coupling region.

3. The sound production apparatus of claim 2, wherein the voice coil assembly comprises a voice coil bobbin and a voice coil wire surrounded on an outside of the voice coil bobbin, and when the elastic member is connected with the voice coil assembly, the elastic member is connected to the voice coil bobbin, or wherein the voice coil assembly comprises a voice coil bobbin and a voice coil wire surrounded on the outside of the voice coil bobbin, and the elastic member is connected to the voice coil wire.

4. The sound production apparatus of claim 1, wherein the component to be connected comprises a cup, the cup has a cup coupling region, and the shape and the structure of the connection end are configured such that the connection end is fitted with the cup coupling region when coupling the connection end and the cup coupling region, and/or wherein the component to be connected comprises a housing, the housing has a housing coupling region, and the shape and the structure of the connection end are configured such that the connection end is fitted with the housing coupling region when coupling the connection end and the housing coupling region, or wherein the component to be connected comprises a cup and a housing, the cup has a cup coupling region, the housing has a housing coupling region, and the elastic member is provided with at least two connection ends, wherein a shape and a structure of one connection end are configured such that the one connection end is fitted with the cup coupling region when coupling the one connection end and the cup coupling region, and wherein a shape and a structure of another connection end are configured such that the another connection end is fitted with the housing coupling region when coupling the another connection end and the housing coupling region.

5. The sound production apparatus of claim 1, wherein the component to be connected comprises a cup, the cup has a cup coupling region, and the shape and the structure of the connection end are configured such that the connection end is fitted with the cup coupling region when coupling the connection end and the cup coupling region, and/or wherein the component to be connected comprises a magnetic circuit system, the magnetic circuit system has a magnetic circuit system coupling region, and the shape and the structure of the connection end are configured such that the connection end is fitted with the magnetic circuit system coupling region when coupling the connection end and the magnetic circuit system coupling region, or wherein the component to be connected comprises a cup and a magnetic circuit system, the cup has a cup coupling region, the magnetic circuit system has a magnetic circuit system coupling region, and the elastic member is provided with at least two connection ends, wherein a shape and a structure of one connection end are configured such that the one connection end is fitted with the cup coupling region when coupling the one connection end and the cup coupling region, and wherein a shape and a structure of another connection end are configured such that the another connection end is fitted with the magnetic circuit system coupling region when coupling the another connection end and the magnetic circuit system coupling region.

6. The sound production apparatus of claim 1, wherein the jointing region has an arc-shaped structure, and the jointing region extends from the connection end in a direction away from the component to be connected.

7. The sound production apparatus of claim 1, wherein the connection end of the elastic member is connected with the component to be connected by coating conductive adhesive or welding.

8. The sound production apparatus of claim 1, wherein the elastic member has a linear structure, the connection end is configured in a linear shape, an outer contour of a region where the component to be connected is coupled with the connection end is configured in a linear shape, and the jointing region is configured in a linear shape.

9. The sound production apparatus of claim 1, wherein the elastic member comprises:

a first connection portion, the first connection portion is electrically connected with the component to be connected, and the first connection portion is the connection end;

a second connection portion, the second connection portion is used to fix the elastic member, and/or the second connection portion is the connection end; and a deformation portion, the deformation portion connects the first connection portion and the second connection portion, at least part of the deformation portion has a structure formed by winding, the gap is formed between a side of the deformation portion close to the component to be connected and the component to be connected, and a region where the deformation portion is jointed with the first connection portion forms a jointing region, and wherein the buffer part is disposed within the gap and abuts against the deformation portion and the component to be connected.

10. The sound production apparatus of claim 9, wherein the deformation portion comprises a first end connected with the first connection portion and a second end connected with the second connection portion, and a central area is provided between the first end and the second end, and wherein the deformation portion is formed by extending from the first end to the central area along a first direction in a straight line and/or a curve and then extending from the central area to the second end along a direction opposite to the first direction in a straight line and/or a curve.

11. The sound production apparatus of claim 9, wherein the component to be connected is configured in a circular shape, the coupling region is configured in an arc shape, the first connection portion is configured in an arc shape, and a radian of the coupling region is equal to a radian of the first connection portion.

12. The sound production apparatus of claim 9, wherein at least one of the first connection portion, the second connection portion and the deformation portion is formed by a wound linear structure, and/or wherein the first connection portion, the second connection portion and the deformation portion are disposed in the same plane.

13. The sound production apparatus of claim 1, wherein the flexible material comprises photosensitive adhesive, glue adhesive, coating adhesive, rubber or silica gel.

14. The sound production apparatus of claim 1, wherein the sound production apparatus further comprises a conforming structure, the conforming structure is connected between the connection end and the coupling region, and the conforming structure is configured to be fitted with the coupling region towards a surface of the coupling region.

15. The sound production apparatus of claim 1, wherein a plurality of elastic members are provided, and a gap is formed between a side of each of the elastic members facing the component to be connected and the component to be connected, and wherein each of the elastic members is provided with at least one buffer part, and each buffer part is disposed within one gap and fills a gap between the elastic member and the component to be connected.

16. An electronic device, comprising the sound production apparatus of claim 1.

* * * * *